(12) United States Patent
Tastl et al.

(10) Patent No.: US 8,493,403 B2
(45) Date of Patent: Jul. 23, 2013

(54) COLOR TRANSFORMATION SAMPLE POINT IDENTIFICATION

(75) Inventors: Ingeborg Tastl, San Mateo, CA (US); John Ludd Recker, Mountain View, CA (US); Yao Zhang, Davis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 769 days.

(21) Appl. No.: 12/554,515

(22) Filed: Sep. 4, 2009

(65) Prior Publication Data
US 2011/0058735 A1  Mar. 10, 2011

(51) Int. Cl.
*G09G 5/02* (2006.01)
(52) U.S. Cl.
USPC .......................... 345/600; 345/603; 345/604
(58) Field of Classification Search
None
See application file for complete search history.

(56) References Cited

U.S. PATENT DOCUMENTS

| | | | |
|---|---|---|---|
| 5,233,684 A | 8/1993 | Ulichney | |
| 5,261,029 A | 11/1993 | Abi-Ezzi et al. | |
| 5,377,025 A | 12/1994 | Spaulding et al. | |
| 6,027,201 A * | 2/2000 | Edge | 347/19 |
| 6,229,916 B1 | 5/2001 | Ohkubo | |
| 2005/0254073 A1* | 11/2005 | Braun et al. | 358/1.9 |
| 2008/0150960 A1* | 6/2008 | Edge et al. | 345/600 |

* cited by examiner

*Primary Examiner* — Kee M Tung
*Assistant Examiner* — Leon T Cain, II

(57) ABSTRACT

Color transformation sample point identification is described. A subset of points from a superset of points representing a colorimetric relationship is identified. The subset of points defines an initial n-simplex with (n+1) points representing an approximation of the colorimetric relationship, where n represents a number of dimensions. An additional point from the superset of points is selected and added to the subset of points to replace the n-simplex with a set of at least two n-simplices. The additional point is selected such that a volume of an (n+1)-simplex formed by the (n+1) points of the initial n-simplex and the additional point is increased. An error value for the approximation is determined by calculating an error volume between the (n+1)-simplex and the superset of points.

21 Claims, 4 Drawing Sheets

COLOR TRANSFORMATION SAMPLE POINT IDENTIFICATION

BACKGROUND

In digital systems, a color image can be represented as a set of pixels. Each pixel may be associated with color values which describe a pixel color for that position in the image. For example, the color values may describe the pixel color in terms of hue, saturation and lightness. The color values can also correspond to color coordinates in a given color space. If the color spaces used for the specification of a color are related to the native color space of a device, they are referred to as device-dependent color spaces (e.g. CMYK values of a specific printer) versus device-independent color spaces, which enable a color specification which is independent of a specific device.

Transforming color image data from one device and displaying, manipulating or printing the image on another device which may have a different colorimetric characteristic is often desirable. For example, RGB data from an input scanner can be converted to a device independent space such as CIELAB. This device independent data may then be received by an output device which may in turn convert the data to a device dependent color space for display, printing, etc. This transformation process can allow images to have the same color appearance across different devices and/or outputs.

Transforming color values from one color space to another color space can be accomplished by relating coordinates in one color space to coordinates in a different color space. Color look-up tables (CLUTs) can be an efficient way to describe transformations between color spaces. However, systems may have either memory or processing or transmission limitations restricting the use of large CLUTS. As a result, CLUTs can be re-sampled with fewer points and interpolation algorithms may be used to approximate colors not explicitly found in the CLUT.

Uniform CLUTs, or CLUTS having color points uniformly distributed or spaced from one another, are often used to approximate non-linear color transformations. A number of entries in the CLUT can be increased to increase accuracy, but this can be inefficient because the number of sample points in both over- and under-sampled parts of the function may be increased. Uniform CLUTs have additional disadvantages in that uniform CLUTs are calculated in some way from original measurement data and additional resources may be needed to ensure a decent accuracy for colors inside, but close to the border of a device color gamut.

DETAILED DESCRIPTION

Figure 1:
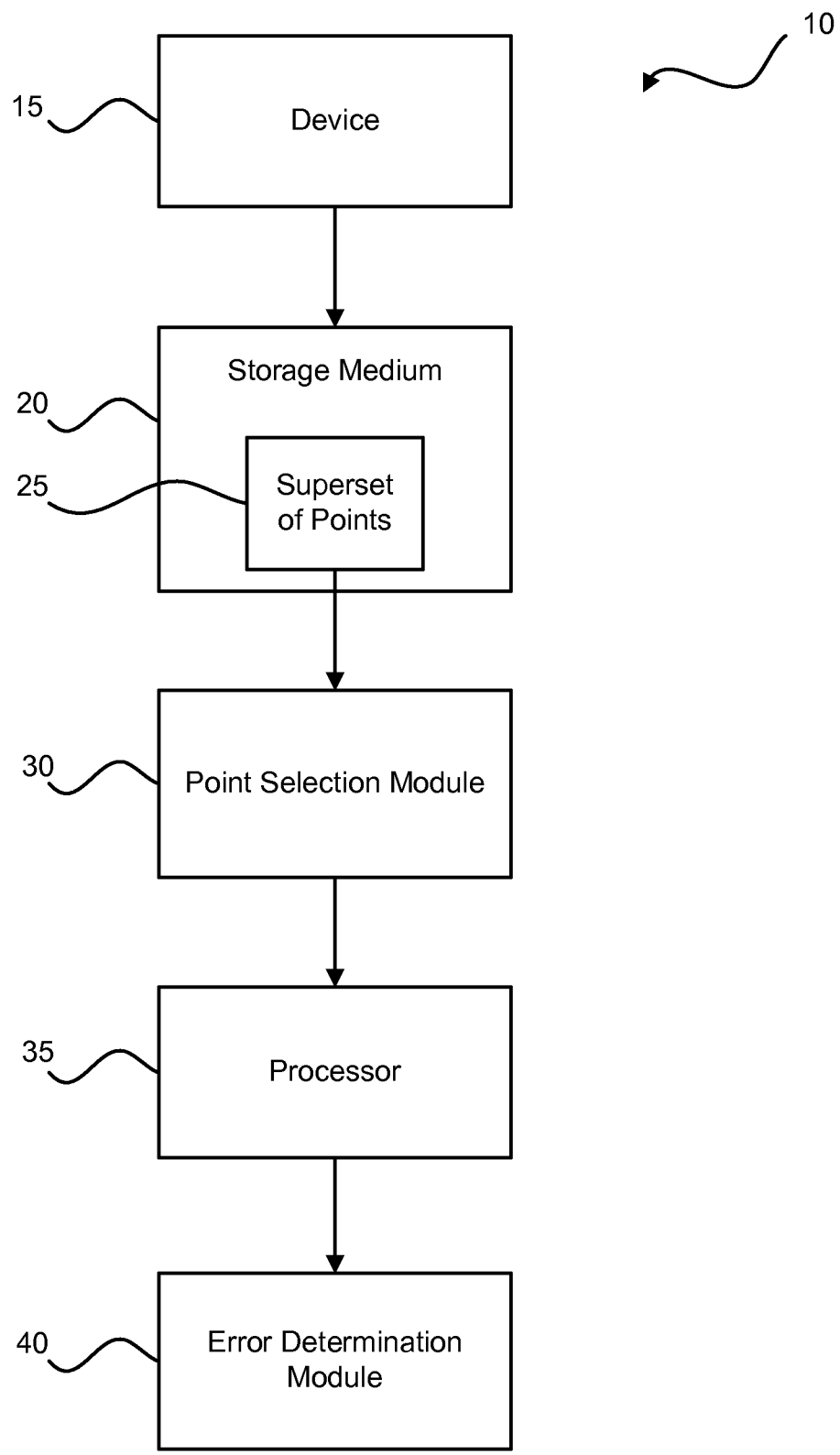
FIG. 1 is a block diagram of a system for color transformation sample point identification in accordance with an embodiment of the present disclosure.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

Commercial printing customers expect solutions which first enable them to reproduce colors as accurately as possible on one device. Solutions which can also enable customers to provide a consistent color appearance across a wide range of printing devices and enable customers to produce pleasing reproductions using the full capabilities of each printing system are desirable. Customers often desire flexible and scalable solutions capable of addressing a number of simultaneous requests. Various solutions have been proposed for efficient, high quality color transforms for image reproduction across color spaces.

A number of different color spaces exist. Some examples include: sRGB, CIE XYZ, CIELAB, CIELUV, CMY(K), etc. Some color spaces, such as XYZ, CIELAB, and CIELUV are device independent and other color spaces, such as sRGB and CMY(K), are device dependent.

Traditionally, non-linear color transformations (e.g., from CIELAB to CMYK) have been approximated by multidimensional uniform color look-up tables (CLUTs) applied in real-time during the ripping process of large documents (containing images, graphics and text). CLUTs can be used to achieve faster processing speeds. For example, finding an enclosing cube or tetrahedron in a uniform 3D CLUT for each color pixel in an image and using values at the corresponding vertices to perform linear interpolations can be very fast. CLUTs can also be stored with other syntax elements in International Color Consortium (ICC) device profiles. By combining three dimensional (3D) CLUTs with one dimensional (1D) look-up tables (LUTs) data can be encoded on a regular grid, but the grid does not necessarily have to be a uniform grid. Grid encoding can entail various limitations. First, data on the grid is derived by some method (interpolation or inverting a printer model) from the original measurement data describing the device characteristic. Second, special attention has to be paid to ensure a high-quality reproduction of colors inside a device gamut, but close to the border. Third, if a regular CLUT is used to approximate a non-linear color transformation, a common way to increase accuracy is by increasing the number of entries in the CLUT, which can be expensive and is inefficient (uniform sampling increases samples in both over and under-sampled parts of the function).

To address issues of effective and efficient high quality color transformations, color transformation sample point identification is described herein. A subset of points from a superset of points representing a colorimetric relationship is identified. The function values of the subset of points define an initial n-simplex with (n+1) points representing an approximation of the colorimetric relationship, where n refers to the dimension. An additional point from the superset of points is selected and added to the subset of points to replace the n-simplex with a set of at least two n-simplices. The additional point is selected such that a volume of an (n+1)-simplex formed by the (n+1) points of the initial n-simplex and the functional value of the additional point is increased. An error value for the approximation is determined by calculating an error volume between the (n+1)-simplex and the superset of points.

As used herein, the term "geometric element" refers to any one, two, or n-dimensional shape, object, figure, or element, including a line or a point. Where "geometric element" is used to describe a specific shape, element, etc. having a particular number of dimensions, or having any specific attributes, such description will accompany the term.

As used herein, "simplex" or "n-simplex" refers to an n-dimensional analogue of a triangle. Specifically, a simplex is the convex hull of a set of (n+1) affinely independent points in some Euclidean space of dimension n or higher, where n refers to the dimension. For example, a 0-simplex is a point, a 1-simplex is a line segment in an at least 1 dimensional Euclidean space, a 2-simplex is a triangle in at least a 2 dimensional space, a 3-simplex is a tetrahedron in at least a 3 dimensional space, a 4-simplex is a pentachoron in at least a 4 dimensional space, and so forth. The n-face of an n-simplex is an affine (n−1)-simplex. Thus, the boundary of an n-simplex is an affine (n−1) chain. For a two-simplex (triangle), a 2-face is a 1-simplex (edge). For a three-simplex (tetrahedron), a 3-face is a 2-simplex (triangle). In some embodiments, n may refer to a number of simplex faces. A "simplicial complex" refers to a topological space constructed by "gluing together" simplex points, line segments, triangles, and their n-dimensional counterparts. A simplicial complex described herein is also referred to as tessellation.

As used herein, the term "volume" refers to the amount of space occupied by an object. "Volume" may be used to describe a space occupied by a two-, three- or n-dimensional object. Accordingly, an area of a two-dimensional object is termed a volume of the object herein. As simplices are frequently referred to herein, the oriented volume of an n-simplex in n-dimensional space with vertices $(v_0, \ldots, v_n)$ is $$\frac{1}{n!}\det(v_1 - v_0, v_2 - v_0, \ldots, v_{n-1} - v_0, v_n - v_0),$$

where each column of the n×n determinant is the difference between the vectors representing two vertices.

As used herein, the term "computer readable medium" is used to generally refer to media usable for storage of information readable by a computing system. The term "computer readable medium" can refer to any such type of media and may include removable storage media, hard disks, computer memory, optical discs, etc. The term is also used to expansively encompass printed material which can be processed by a computing system through scanning, such as through a scanning device. For example, in one embodiment described herein, the computer readable medium may be a paper or set of papers upon which a test chart, which may be a sampling of a device color space, is printed.

As used herein, the term "color function" is used to describe a colorimetric relationship. The relationship may be represented by an equation, a plurality of color points, digital or printed color charts, characters or coordinates representing colors, and so forth. A color function as used herein can also represent a relationship between a discrete set of points of two color spaces.

Referring to FIG. 1, a system 10 for identifying a set of sample points from a superset of points specifying a color transformation is shown in accordance with an embodiment of the present disclosure. The system includes a device 15 whose color output can be described in a device-dependent or device-independent color space. The device can be configured to provide a color output on at least one of a display device, a processor, and a printer. The output can be on a computer readable medium 20 and can represent the colorimetric characteristic of that device (e.g., color function). In one aspect, the output may comprise a color test chart printed on paper representing device-dependent color values and the corresponding measured device-independent values. The colors on the test chart and measured values may represent the color function. In one aspect, the test chart may comprise at least a sampling of the device gamut.

A point selection module 30 can be configured to identify a subset of points from a superset of points 25. The subset of points can define a geometric element and can represent an approximation of the superset of points. For example, referring to FIG. 2a, a color function 130 is represented as a graph describing the relationship of points on the two axes 110, 120. The color function can be described by a superset of points $\{xA, \ldots xB\}$ and the corresponding function values $\{A=f(xA), \ldots B=f(xB)\}$ represented by the X's on the curved line. In this example, the curved line is drawn for convenience. In other examples a curved line may be described by a mathematical equation which may be determined at least in part at the locations of the superset of points. In yet another example, the color function can be represented by line segments between the function values of the superset of points. A subset of points $\{xA, xB\}$ and the corresponding function values $A=f(xA)$ and $B=f(xB)$ can be selected. The function values A, B define a geometric element 140 (in this case, a line), extending between the function values of the points. The geometric element 140 is an approximation of the color function 130. The function values of the subset of points can define an initial n-simplex with (n+1) points representing an approximation of a colorimetric relationship represented by the superset of points.

Figure 2A:
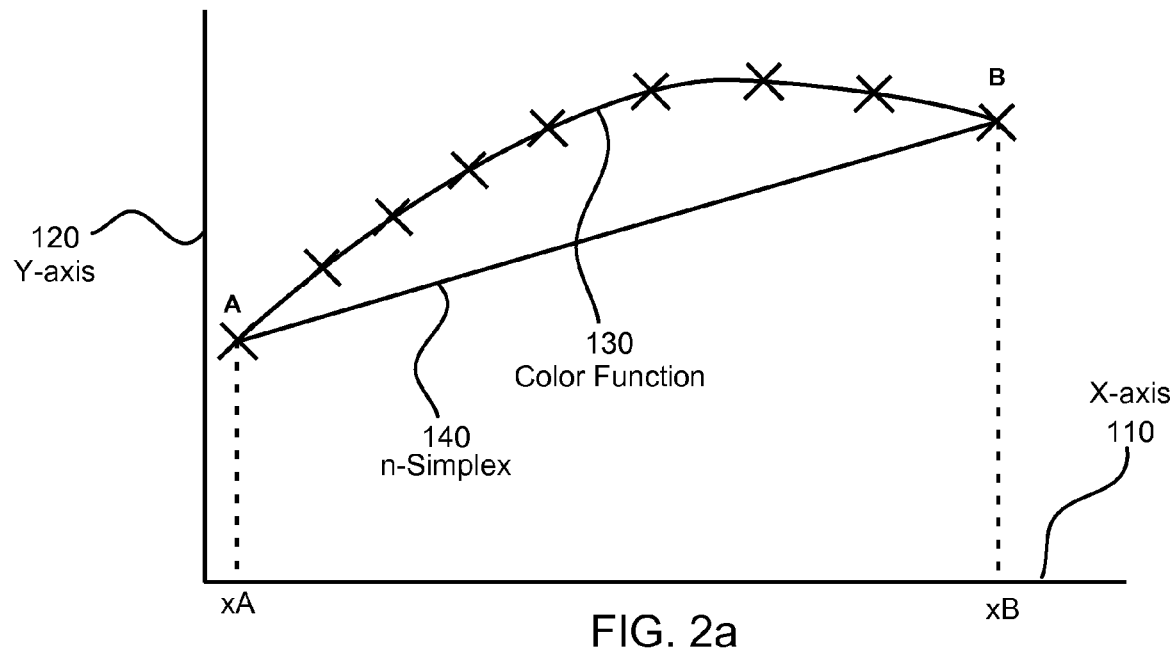
FIGS. 2a-2b present graphical diagrams illustrating identification of a subset of points from a superset of points in accordance with an embodiment of the present disclosure.
Figure 2B:
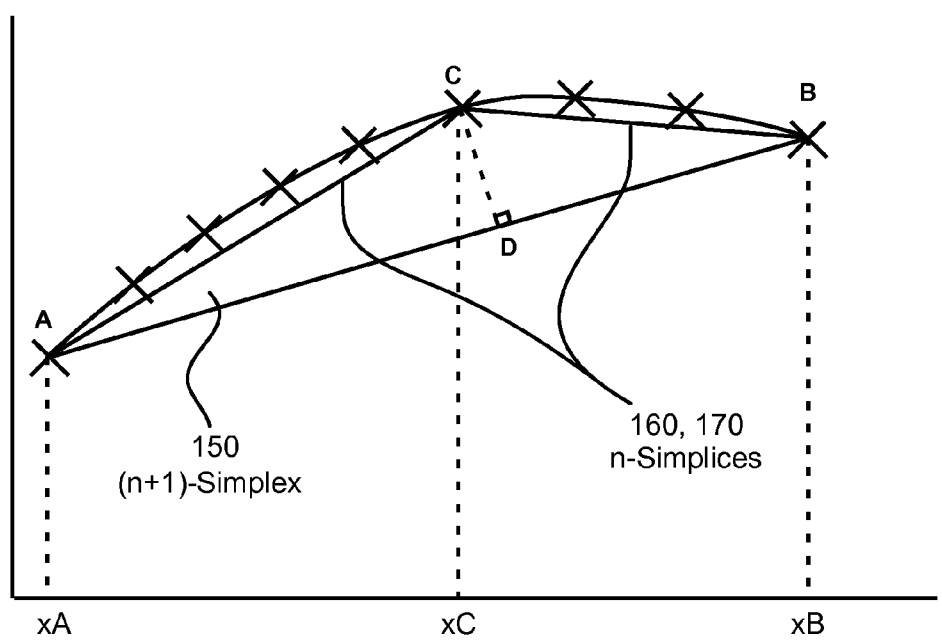
Figure 3:
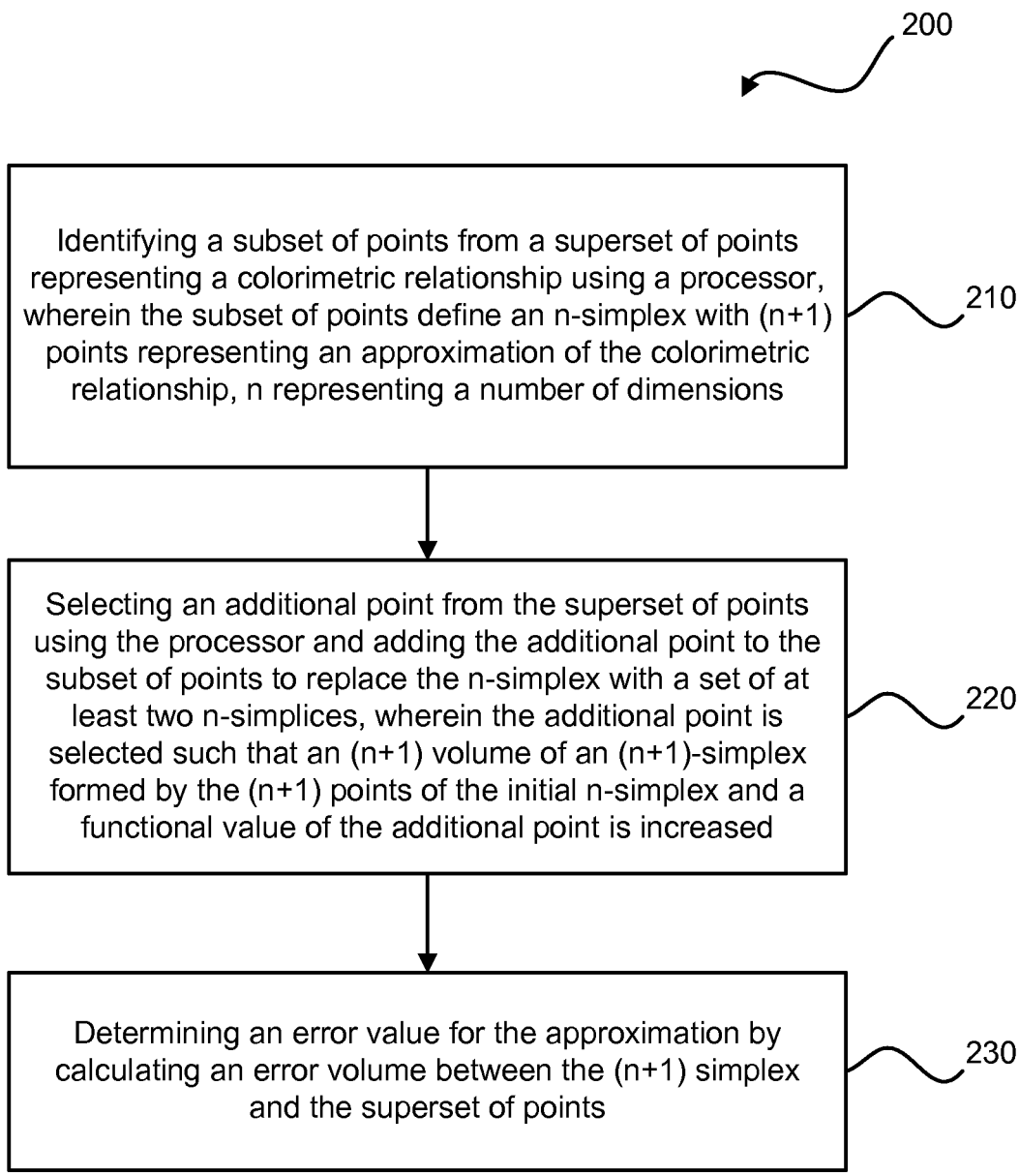
FIG. 3 is a flow diagram of a method for color transformation sample point identification in accordance with an embodiment of the present disclosure.

Referring again to FIG. 1, the system may further include a processor 35 configured to select an additional point of the color function. The processor can add the additional point to the subset of points to create a new geometric element. As shown in FIG. 2b, the processor can be configured to select the additional point such that a volume 150 of an (n+1)-simplex formed by the (n+1) points of the initial simplex and the functional value of the initial point is increased. The additional point is added to the subset of points to replace the n-simplex 140 with a set of at least two n-simplices 160, 170 (in one dimension a single line segment can be replaced by two line segments; in two dimensions a single triangle can be replaced three triangles, etc). The additional point can be selected such that an (n+1) volume 150 of an (n+1)-simplex formed by the (n+1) points of the initial n-simplex and the functional value of an additional point is increased. In other words, the (n+1) volume is the volume encompassed by the initial n-simplex and the (n+1) new n-simplices replacing the initial n-simplex.

Referring back to FIG. 1, the system can also include an error determination module 40. The error determination module can be configured to determine an error value for the approximation of the color function by the geometric element and/or the new geometric element. The error determination module can determine an error value by calculating a volume between the (new) geometric element and the color function. To describe the error calculation in other terms, the error value is determined by the difference between an (n+1) volume of the (n+1)-simplex and the (n+1) volume enclosed by the superset of points. Referring to FIG. 2a, as an example, the function values of the superset of points between A and B can describe a function and the volume enclosed by the function values of the superset of points is the area between the curve and a line between points A and B (which line is, at least in this case, the same as the simplex or line element approximating the curve). However, in accordance with embodiments of the present disclosure, the function values of the superset of points between A and C as well as B and C can describe a new function.

Point selection and error determination will now be further described. In one embodiment, test patches or samples from a uniformly sampled device space (e.g., pRGB) are printed and measured (e.g., CIELAB). These samples can form a superset (set of points in RGB space and the corresponding function values in Lab space) from which the subset of samples (points in RGB space and corresponding function values in Lab space) can be selected. Additional points can be added to the subset iteratively. An objective of iteration may be to reduce a mean squared error of the approximation of the color function or sample superset by the geometric element or sample subset. The completed sample subset can be used for an efficient color transformation. Furthermore, the sample subset can be used to define a device and media specific test chart which customers may use to characterize a different device unit of the same model.

Point selection can be assisted through mathematical optimization. To illustrate, consider the relationship of Let function $f: R^m \rightarrow R^n$ represent the transform from a printer color space $R^m$ to a device independent color space $R^n$. This function can be approximated by a piecewise linear function $f_s$ described by a large set of samples $S=\{(p_i: p_i \in R^m, i=1, 2, \ldots l\}$ and the corresponding function values $F(S)=\{(f(p_i): f(p_j) \in R^n, i=1, 2, \ldots l\}$, where S is the set of samples, p is an individual sample point, i is an integer, l is the total number of samples. A subset of samples $S_{sub}=\{p_j: p_j \in R^m, j=1, 2, \ldots k, k \leq l\}$ and the corresponding function values $F(S_{sub})=\{f(p_j): f(p_j) \in R^n, j=1, 2, \ldots k, k \leq l\}$ can be selected such that the error, i.e., the distance $L_p$ between $f_s$ and $f_{sub}$ is minimized. The distance $L_p$ can be defined as $\|f_s - f_{sub}\|_p = [\int |f_s(v) - f_{sub}(v)|^p dv]^{1/p}$ where v is a multidimensional input variable, $\|f_s - f_{sub}\|_1$ is the integral absolute error (IAE) and $\|f_s - f_{sub}\|_2$ the integral squared error (ISE).

When working in one dimension, a curve can be approximated by line segments and the error is equal to the area between the line segments and the curve. Mathematically, the following error can be minimized:

$$\text{Error} = \int_{x1}^{x2} |f_s(x) - f_{sub}(x)| dx.$$

In two dimensions, a surface can be approximated by a triangle mesh, and the error is the volume between the triangle mesh or triangle patches in the triangle mesh and the surface. The following error can be minimized for two dimensions:

$$\text{Error} = \int_{y1}^{y2} \int_{x1}^{x2} |f_s(x, y) - f_{sub}(x, y)| dx dy.$$

For three dimensions, a 3D volume can be approximated by a set of tetrahedra and the error is the mass between the tetrahedra and the volume. The following error can be minimized:

$$\text{Error} = \int_{z1}^{z2} \int_{y1}^{y2} \int_{x1}^{x2} |f_s(x, y, z) - f_{sub}(x, y, z)| dx dy dz.$$

Implementation of the above point selection and error metric is now described for one dimensional implementations. Selecting sample points on a function $f$ such that a piecewise linear approximation function $f_{sub}$, defined by the selected sample points, leads to the smallest possible error is desirable. As used herein $f$ can represent an actual mathematical equation or formula, or a plurality of color points, digital or printed color charts, characters or coordinates representing colors, etc. In other words, the symbol $f$ is used synonymously with the term "color function" previously described. In a preferred embodiment, $f$ represents the relationship between a superset of color points and their corresponding functional values. $f_{sub}$ is used similarly with the primary difference being that in embodiments where $f$ represents a relationship defined by a superset of color points, $f_{sub}$ represents a relationship defined by a subset of color points including fewer points than the superset.

In one aspect, one additional point can be added to the subset at individual iterations of the point selection. More than one point may also be selected at each iteration, but this may lead to less efficient sampling. Starting with two sample points (as in FIG. 2a) a function $f$ and a piecewise linear approximation using the two sample points, the original error is the area or 2-volume between the two functions. Adding an additional point can reduce the error as shown in FIG. 2b. Accordingly, an iterative solution may be used to approximate $f(x)$ by geometric elements such as line segments. Incidentally, selecting the point furthest away from line AB can result in a minimal error. For example, referring to FIG. 2b, the functional value f(xC)=C is the point furthest away from the line segment formed or defined by points A and B. Thus the point xC gets added to the subset of points.

In one embodiment, the iterative solution is a method 200 for identifying a set or subset of sample points, which together with their corresponding function values, specify a color transformation. A subset of points and corresponding function values from a superset of points and function values representing a colorimetric relationship can be identified 210 using a processor on a computing system. The superset of points and corresponding function values can be stored on a first computer readable medium. The function values of a subset of points can define an n-simplex with (n+1) points representing an approximation of the colorimetric relationship, n refers to the dimension. An additional point can be selected 220 from the superset of points using the processor and added to the subset of points. The n-simplex formed by the function values of the points of the subset will be replaced with a set of at least two new n-simplices. The additional point can be selected such that an (n+1) volume of an (n+1)-simplex formed by the (n+1) points of the initial n-simplex (which are function values of the points in the subset) and the functional value of the additional points is increased. In other words, the original n-simplex and the (n+1) new n-simplices from a new (n+1)-simplex and the volume is increased. An error value for the approximation can be determined 230 by calculating an error volume between the (n+1)-simplex and the superset of points. The subset of points and the corresponding function values can be stored on one of the first computer-readable medium or a second computer-readable medium. The second computer-readable medium can be different than the first computer-readable medium. For example, the first computer-readable medium may be a printed color chart from which the superset of points and their corresponding function values was derived, and the second computer-readable medium may be a color chart formed from the subset of points and be printed on a separate paper and the corresponding function values can be derived. As an alternate example, the second computer-readable medium may be a computer storage medium, such as an optical disc, hard drive, etc. In one aspect, the selection of the additional point is the selection of a single additional point and is made such that the (n+1) volume of the (n+1)-simplex formed by the (n+1) points of the initial n-simplex and the functional value of the additional point is maximized. The method may further comprise using the subset of points and the corresponding function values to transform the colors of an image from one color space to another.

An error value for the approximation of the color function by the new geometric element can be determined by calculating a volume between the new geometric element and the color function, or by calculating the difference between the sum of the volumes of the (n+1)-simplex (e.g., geometric element defined by the plurality of n-simplices and the functional value of the additional point) and the volume enclosed by the superset of points. The volume can be calculated as has been described. The subset of points and their corresponding functional values, now with the additional point and functional value, can be stored on a same or a different computer-readable medium as the superset of points. The method, or a portion of the method, can be iteratively repeated until a threshold number of points have been added to the point subset or until a threshold error value has been reached.

In one one-dimensional point selection embodiment, the method may be performed as follows. An initial point set $S_{sub}$ and the corresponding functional values can be created which consists of two endpoints of $f$ and a set of line segments L consisting of 1 line segment whose end points are the functional values of the two points in $S_{sub}$. For each line segment $l_i \epsilon L$, the point $p_i \epsilon S$ can be selected where the point is on the part of function f which the line segment $l_i$ is approximating, and where the functional value of the point is the furthest point to the line segment $l_i$. The area $a_i$ of the triangle defined by $f(p_i)$ and the two end points of $l_i$ can then be calculated. When a maximum $a_j = \max\{a_i\}$ is found, the corresponding point $p_j$ can be added to the subset $S_{sub}$, $S_{sub} = S_{sub} \cup \{p_j\}$; $L = (L - \{l_j\}) \cup \{(f(p_j), A) \cup (p_j, B)\}$ where A and B are the endpoints of $l_i$ and are functional values of points who were already in the subset. The method can be continued until a number of elements in $S_{sub}$ is equal to a threshold. Point $p_j$ corresponds to point xC in FIG. 2b.

In one two-dimensional point selection embodiment, the method may be performed similar to the above-described one-dimensional embodiment, except that the functional value of the selected point can be the furthest away point from a specific triangle. For each triangle the error can be determined by calculating a volume of a tetrahedron formed by $f(p_i)$ and the end points of the triangle. The point $f(p_i)$ corresponding to the tetrahedron with the maximum volume can be selected and the respective triangle can be replaced by 3 sub-triangles.

In accordance with a three-dimensional point selection embodiment, tetrahedra may be used. A functional value of a point $p_j$ can be selected for each tetrahedron such that a mass for the tetrahedron is maximized. By maximizing the mass for the tetrahedron, the error value (e.g., a mass difference between the mass of the tetrahedron formed by the point subset and the mass defined by the color function or superset of points) can be minimized. The maximum of the mass can be calculated and a corresponding point pj can be selected. The tetrahedron surrounding the selected point can then be subdivided into four tetrahedra.

In one aspect, a point may be selected for a two dimensional function by simply applying a two-dimensional point selection method. In this example, the initial n-simplex will be a 2-simplex (e.g., triangle) and the point pj is selected whose functional value f(pj) together with the triangle forms a maximum 3-volume. The initial triangle can be replaced by 3 subtriangles. In a subsequent iteration, an additional point can be added and one of the subtriangles can be further subdivided into 3 subtriangles and so forth.

In accordance with another aspect for a three dimensional color space point selection, the initial subset consists of the 8 corners of the cube of the device dependent space (e.g. RGB). In an example for illustrative purposes, the simplicial complex can consist of 5 tetrahedrons (e.g., 5 3-simplices). Adding an additional point pj to the subset means finding the point of the superset whose functional value (e.g. Lab=f(RGB)) together with one 3-simplex forms a 4-simplex whose 4-volume (mass) is maximized.

Using the point selection processes described can result in a non-uniform sampling of a device color space (R,G,B) $\epsilon$pRGB and can account for the curvature of $f(R,G,B)\epsilon$-CIELAB. The non-uniform sampling allocates more sample points to areas of high curvature of the color function to achieve a desired accuracy while reducing a number of points where curvature of the color function is lower to improve overall efficiency. The processes are data-dependent point selection processes. Experimental data indicates that a predetermined accuracy can be achieved with a smaller number of sample points when using a non-uniform sampling process than can be achieved when using a uniform point sampling process. A smaller number of samples can also be useful for a direct color transformation, which will be described below. Performance for 3D direct color transformations may at least partially depend on a number of tetrahedra (the number of tetrahedra being dependent on the number of sample points). As a number of tetrahedra increases, accuracy of the transformation may be increased but speed of the transformation may be decreased. For commercial printing solutions both speed and accuracy may be desirable. In some situations speed or accuracy may be desired and a trade-off may be made to suit a particular print job. For example, a high quality photo-book may be better suited to a different accuracy than direct mail.

In accordance with various embodiments the set of sample points created through the systems and methods herein can be tailored to specific needs. For example, a set of sample points may be created to suit a color transformation for a particular device to achieve predetermined performance characteristics. In one aspect, a plurality of sets of sample points may be created for the device. A user may then specify a type of print job or a desired performance characteristic and a set of sample points may be selected from the plurality of sets of sample points to best suit the user specification. In yet another aspect, a set of sample points can be created as needed to match the user specification.

By using the point selection processes described, a color transformation can be specified in a more efficient (fewer points, faster processing) and accurate way than has been possible with prior systems and methods. Alternatively, the point selection process can result in a non-uniform test chart which can be provided to customers to build color transforms for other units of the same device. Printing a test chart with fewer samples can result in less use of customer resources (ink, media, time) and provide cost savings to the customer.

Color transformations can be direct or indirect. For indirect color transformations, generally an ICC profile is built from a uniform color test chart (first interpolation) and then applied to a data set (second interpolation). A direct transformation involving only one interpolation can be performed using tessellations. Generally, for direct transformations a uniform test chart is used to generate a tessellation from which device dependent values for a data set are calculated through interpolation. The transformation is "direct" because the uniform test chart in device color space is directly used to transform the data set. Non-uniform test charts created using the systems and methods described herein can result in higher color accuracies than uniform test charts across different numbers of test samples regardless of whether the uniform test charts are used for direct transformation or indirect transformation using ICC profiles.

Using either a uniform or non-uniform set of samples in a device color space results in a set of scattered or non-uniformly distributed color data points in the device-independent space (e.g. CIELAB) when the uniform or non-uniform set of samples is printed and measured. For printing purposes, this set of scattered data points can be used to directly transform colors of an image from the device-independent color space into the device-dependent color space using interpolation and tessellation. (Although "tessellation" is the term primarily used herein, any form of simplicial complex may be used). A variety of methods for scattered data interpolation exist. One such method involves tetrahedral interpolation which can create a complete tessellation of the scattered data points. For non-uniform color test charts, Delaunay tessellations are often created. Delaunay tessellations can provide well-shaped simplices which are substantially equiangular. In Delaunay tessellations a minimum angle in a tessellation is maximized. One issue with Delaunay tessellations is that Delaunay tessellations are always convex, whereas printer gamuts are often concave in CIELAB.

Figure 4A:
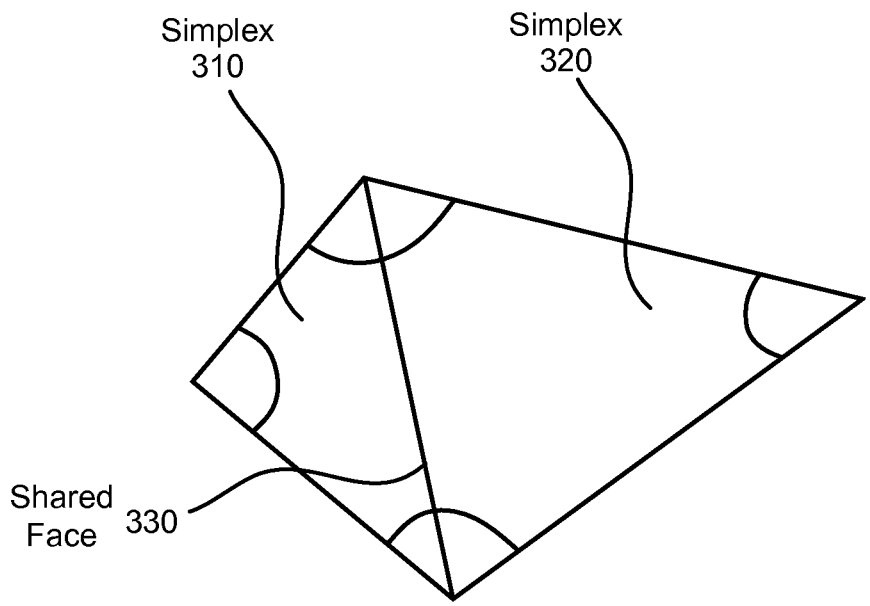
FIGS. 4a-4b illustrate face switching for simplicial complex optimization in accordance with an embodiment of the present disclosure.
Figure 4B:
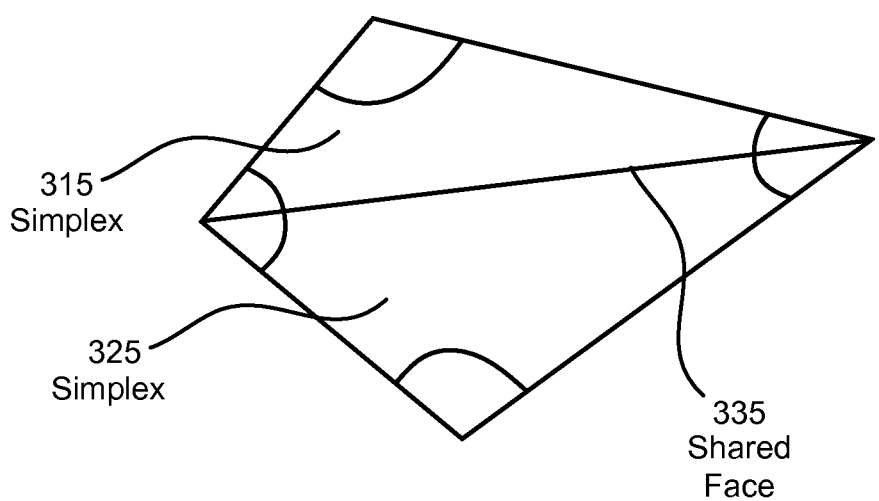

To overcome shortcomings of prior tessellation solutions, the error metric described herein can be used to optimize tessellations which are able to provide improved color approximations and which are suited to particular printer characteristics through data dependency. In accordance with an embodiment, the geometric element described above as formed from the subset of points can comprise a plurality of geometric elements which are part of a tessellation. Referring to FIGS. 4a-4b, the tessellation can be optimized by selecting at least two adjacent geometric elements 310, 320. The geometric elements may have a desired direction and at least one shared internal edge 330. A determination can be made as to whether an error value is reduced by switching the at least one internal edge from extending between at least two shared geometric element points to create a new internal edge 335 extending between at least two different non-shared geometric element points to redefine the at least two adjacent geometric elements (shown as redefined geometric elements 315, 325). The at least one internal edge can be switched when the error value is determined to be reduced through switching. The shared geometric points are points in the subset of points from which the geometric elements are defined and which are used in creating the tessellation.

The tessellation optimization may be iteratively repeated until a threshold number of iterations has been performed or until the error value cannot be further reduced by switching internal edges of adjacent geometric elements or a threshold error value has been reached. The error value can be calculated using the previously described error calculation techniques. In one aspect, additional point selection and tessellation optimization can be alternated to create an optimized tessellated point subset. The alternation can continue until a threshold has been reached. The threshold may be performance of a predetermined number of iterations or reduction of error to a predetermined value.

The tessellation optimization may also be described in terms of simplicial complex optimization wherein a set of at least two n-simplices 310, 320 form a simplicial complex. At least two adjacent n-simplices having at least two shared points and a shared face 330 are selected and a determination is made whether an error value can be reduced by switching the shared face from extending between the at least two shared points to extend between at least two different non-shared points to redefine the at least two adjacent n-simplices. When the error value is determined to be reduced by switching the shared face of the at least two adjacent n-simplices the face can be switched. The switched face 335 and the redefined two adjacent n-simplices 315, 325 are shown in FIG. 4b. The optimization may be iteratively repeated and a same n-simplex may be optimized any number of times using different adjacent simplices. In one aspect, a simplex may be optimized with an adjacent simplex, be further optimized with a different adjacent simplex, and later be optimized again with the first optimized adjacent simplex (which may be the same as resulting from the first optimization, or which may also have been further optimized).

In the case of two-dimensional tessellation optimization, long thin triangle tessellations can be good for linear color interpolation. Data-dependent tessellations can account for the location of sample points (x,y), function values of the sample points f(x,y), and characteristics or requirements of the function being approximated. Specifically, long thin triangles can be well suited to approximate a function f(x,y) having a preferred direction (e.g. large second-directional derivate in one direction, compared to another direction) where the long sides of the triangles are in the direction of small curvature for f(x,y).

Such a data-dependent triangulated tessellation can be constructed by starting with an initial triangular tessellation. A pair of adjacent triangles having a shared internal edge and two shared points can together form a quadrilateral with an internal edge extending between the two shared points. The error value associated with the two triangles of the quadrilateral can be determined. An error value can also be determined for the two triangles resulting from switching the internal edge, where the internal edge has been switched to extend between the two non-shared points of the triangles forming the quadrilateral. Switching the internal edge will redefine the two adjacent geometric elements. The same quadrilateral will exist, but the triangles will be redefined. The error value described is the difference between the approximation by the tessellation and the color function and is calculated as has been described. A tessellation with long sides of the triangles in the direction of small curvature of the color function can have a reduced error compared with long sides of the triangles in the direction of large curvature of the color function. Iteratively repeating the internal edge switching and error evaluations throughout the data dependent tessellation can result in an overall substantial reduction in approximation error over previous color transform tessellation methods.

In a more detailed embodiment, the optimization can be performed as follows. Given a set of points $p_j(x,y)$ and corresponding function values $f(p_j)$, an initial Delaunay tessellation of the points $p_j$ can be performed, resulting in a list of triangles. For each triangle, a test can be performed to test whether the triangle and an adjacent triangle form a convex quadrilateral. If the test is met (e.g., the triangle and the adjacent triangle form a quadrilateral whose six angles are all smaller than 180°), a test can be performed to test whether swapping the internal edge of the quadrilateral reduces the cost or approximation error. If the cost is reduced, the edge can be swapped and the two initial triangles can be replaced with two new triangles. The two new triangles can be put at the end of the list of triangles. The process can be repeated until no further edges can be swapped or an error threshold is met or until a predetermined number of iterations of the process have been performed. An error measure of a triangle is the volume of the largest tetrahedron formed by the triangle and the point $p_j \in \{S-S_{sub}\}$ where a two-dimensional projection of the point is inside the triangle. An error measure for a pair of triangles is the sum of the errors for each of the triangles.

Three dimensional tessellation optimizations or simplicial complex optimizations can also be made. For three-dimensional optimizations tetrahedra can be used in place of triangles and volume can be replaced by mass. The above two dimensional optimization description is broadened through the simplicial complex optimization description above which describes the optimization in terms of faces and simplices and can describe an optimization over two or more dimensions.

In accordance with an embodiment, tessellation and point selection can be iteratively alternated to create an optimized, tessellated point subset for color transformations. In a first step, a new point $p_j \in \{S-S_{sub}\}$ can be selected using the point selection processes described above using a tessellation from a previous iteration. In a second step, the tessellation can be optimized using the data-dependent tessellation optimization described above.

In accordance with various embodiments, the systems and methods described can use a Graphic Processing Unit (GPU) in a raster image process (RIP) to address the color transformation speeds of digital presses in an effective and scalable form. In other words, using the GPU within a RIP to perform a color transformation of documents and images using the subset of points and the corresponding functional values can allow for faster performance of the transformation. The computational power of the GPU can be used to overcome long-standing constraints on color transforms. The systems and methods can also be implemented in the form of a computer-readable medium having instructions for identifying a set of sample points specifying a color transformation stored thereon that, when executed, direct a processor to complete the processes described herein.

Systems, methods, modules, etc. described herein may be implemented with any variety of hardware, software, or firmware, as understood by one having skill in the art.

The non-uniform sample points selection herein can be used to specify a color transformation in a more accurate way than may be achievable through a same number of uniformly distributed samples. Further, a specific accuracy can be achieved with fewer sample points which results in better real-time performance (i.e., fewer tetrahedra are searched for the transformation before finding the enclosing tetrahedron for the color of a specific pixel). Using fewer sample points can result in a cost savings and use of fewer resources (ink, media, time, etc.). Furthermore, an optimized test chart generated for a specific printer can lead to superior results over a uniform test chart when used on a different printer unit of the same model. The point selection can be used to describe a printer characteristic or any color transformation specified by a uniform CLUT in a more efficient way.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for identifying a set of measured sample points specifying a color transformation, comprising:
   identifying a subset of measured points from a superset of measured points representing a colorimetric relationship using a processor, wherein the subset of measured points define an n-simplex with (n+1) measured points representing an approximation of the colorimetric relationship, n representing a number of dimensions;
   selecting an additional measured point from the superset of measured points using the processor and adding the additional measured point to the subset of measured points to replace the n-simplex with a set of at least two n-simplices, wherein the additional measured point is selected to increase an (n+1) volume of an (n+1)-simplex formed by the (n+1) measured points of the initial n-simplex and a functional value of the additional measured point; and
   determining an error value for the approximation by calculating an error volume between the (n+1) simplex and the superset of measured points wherein each of the (n+1) volume and the error volume refers to an amount of space occupied by a geometrical object in a simplicial complex.

2. A method in accordance with claim 1, wherein the set of at least two n-simplices form a simplicial complex, the method further comprising optimizing the simplicial complex by:
   selecting at least two adjacent n-simplices having at least two shared measured points and a shared face;
   determining whether an error value is reduced by switching the shared face from extending between the at least two shared measured points to extend between at least two different non-shared measured points to redefine the at least two adjacent n-simplices; and
   switching the shared face of the at least two adjacent n-simplices when the error value is determined to be reduced by switching.

3. A method in accordance with claim 2, further comprising iteratively repeating the simplicial complex optimization until a threshold number of iterations has been performed or the error value can not be further reduced by switching faces.

4. A method in accordance with claim 2, further comprising alternating additional measured point selection and simplicial complex optimization until a threshold has been reached.

5. A method in accordance with claim 1, wherein the additional measured point is a single additional measured point and wherein the single additional measured point is selected such that the (n+1) volume of the (n+1)-simplex is maximized.

6. A method in accordance with claim 1, further comprising iteratively repeating selecting a measured point from the superset of measured points and adding the selected measured point to the subset of measured points, and determining the error value until a threshold number of measured points has been added to the measured point subset.

7. A method in accordance with claim 1, further comprising iteratively repeating selecting a measured point from the superset of measured points and adding the selected measured point to the subset of measured points, and determining the error value until a threshold error value has been reached.

8. A method in accordance with claim 1, further comprising transforming an image from at least one of a device dependent space and a device independent space to the other of the at least one of the device dependent space and the device independent space using the stored subset of measured points.

9. A method in accordance with claim 1, further comprising printing and measuring test colors from a uniformly sampled device color space, wherein the superset of measured points is defined as the test colors.

10. A method in accordance with claim 1, wherein the superset of measured points is stored on a first computer-readable medium, the method further comprising storing the subset of measured points on one of the first computer-readable medium and a second computer-readable medium.

11. A method in accordance with claim 1, wherein a one-dimensional error value is determined using the formula $$E = \int_{x1}^{x2} |f_s(x) - f_{sub}(x)| \, dx,$$

where E is the error value, x1 and x2 are the measured points in the subset of measured points, $f_s(x)$ is a function representing the superset of measured points, and $f_{sub}(x)$ is a function representing the subset of measured points.

12. A method in accordance with claim 1, wherein a two-dimensional error value is determined using the formula $$E = \int_{y1}^{y2} \int_{x1}^{x2} |f_s(x, y) - f_{sub}(x, y)| \, dx \, dy,$$

where E is the error value, x1 and x2 are measured points in the subset of measured points in a first dimension, y1 and y2 are measured points in the subset of measured points in a second dimension, $f_s(x,y)$ is a function representing the superset of measured points, and $f_{sub}(x,y)$ is a function representing the subset of measured points.

13. A method in accordance with claim 1, wherein a three-dimensional error value is determined using the formula $$E = \int_{z3}^{z2} \int_{y1}^{y2} \int_{x1}^{x2} |f_s(x, y, z) - f_{sub}(x, y, z)| \, dx \, dy \, dz,$$

where E is the error value, x1 and x2 are measured points in the subset of measured points in a first dimension, y1 and y2 are measured points in the subset of measured points in a second dimension, z1 and z2 are measured points in the subset of measured points in a third dimension, $f_s(x,y,z)$ is a function representing the superset of measured points, and $f_{sub}(x,y,z)$ is function representing the subset of measured points.

14. A system for identifying a set of sample measured points specifying a color transformation, comprising:
a measured point selection module configured to identify a subset of measured points from a superset of measured points stored on a computer-readable medium, the superset of measured points representing a colorimetric relationship, wherein functional values of the subset of measured points define an n-simplex with (n+1) measured points representing an approximation of the colorimetric relationship, n representing a number of dimensions;
a processor configured to select an additional measured point from the superset of measured points and add the additional measured point to the subset of measured points to replace the n-simplex with (n+1) n-simplices, wherein the additional measured point is selected to increase such that an (n+1) volume of an (n+1)-simplex formed by the (n+1) measured points of the n-simplex and a functional value of the additional measured point; and
an error determination module configured to determine an error value for the approximation by calculating an error volume between the (n+1)-simplex and the superset of measured points wherein each of the (n+1) volume and the error volume refers to an amount of space occupied by a geometrical object in a simplicial complex.

15. A system in accordance with claim 14, further comprising a device having a device dependent color space, wherein the device is configured to provide a color output on at least one of a display device, a processor, and a printer, the output representing a source of the superset of measured points from which the subset of measured points are identified.

16. A system in accordance with claim 14, further comprising a device having a device independent color space, wherein the device is configured to provide a color output on at least one of a display device, a processor, and a printer, the output representing a source of the superset of measured points from which the subset of measured points are identified.

17. A system in accordance with claim 14, wherein the (n+1) n-simplices form a simplicial complex, and wherein the processor is further configured to optimize the simplicial complex by:
selecting at least two adjacent n-simplices having at least two shared measured points and a shared face;
determining whether an error value is reduced by switching the shared face from extending between the at least two shared measured points to extend between at least two different non-shared measured points to redefine the at least two adjacent n-simplices; and
switching the shared face of the at least two adjacent n-simplices when the error value is determined to be reduced by switching.

18. A non-transitory computer-readable medium having instructions for identifying a set of sample measured points specifying a color transformation stored thereon that, when executed, direct a processor to:
identify a subset of measured points from a superset of measured points representing a colorimetric relationship, wherein functional values of the subset of measured points define an initial n-simplex with (n+1) measured points representing an approximation of the colorimetric relationship, wherein n represents a number of dimensions;
select an additional measured point from the superset of measured points and add the additional measured point to the subset of measured points to replace the n-simplex with (n+1) n-simplices, wherein the additional measured point is selected to increase such that an (n+1) volume of an (n+1)-simplex formed by the (n+1) measured points of the initial n-simplex and the additional measured point; and
determine an error value for the approximation by calculating an error volume between the (n+1)-simplex and the superset of measured points wherein each of the (n+1) volume and the error volume refers to an amount of space occupied by a geometrical object in a simplicial complex.

19. A computer-readable medium in accordance with claim 18, wherein the set of at least two n-simplices form a simplicial complex, and wherein the processor is further directed to optimize the simplicial complex by:
selecting at least two adjacent n-simplices having at least two shared measured points and a shared face;
determining whether an error value is reduced by switching the shared face from extending between the at least two shared measured points to extend between at least two different non-shared measured points to redefine the at least two adjacent n-simplices; and switching the shared face of the at least two adjacent n-simplices when the error value is determined to be reduced by switching.

20. A computer-readable medium in accordance with claim 19, wherein the processor is further directed to alternate additional measured point selection and simplicial complex optimization until a threshold has been reached.

21. A method in accordance with claim 1, wherein if n equals 1, the (n+1) volume is an area.

* * * * *